United States Patent
Torres et al.

[11] Patent Number: 6,156,250
[45] Date of Patent: Dec. 5, 2000

[54] CONSTRUCTING FULLY DENSE COMPOSITE ACCURATE TOOLING

[75] Inventors: Michael J. Torres, Oxford; Michael F. Wells, Bridgeport, both of Conn.

[73] Assignee: MCP Metalspecialties, Inc., Fairfield, Conn.

[21] Appl. No.: 09/225,129

[22] Filed: Jan. 4, 1999

[51] Int. Cl.[7] ................................................. B29C 39/02
[52] U.S. Cl. .................... 264/102; 264/152; 264/219; 264/279.1; 264/299
[58] Field of Search .................. 264/102, 219, 264/152, 299, 279.1

[56] References Cited

U.S. PATENT DOCUMENTS

| | | | |
|---|---|---|---|
| 2,696,022 | 12/1954 | Steinbock et al. | 18/30 |
| 3,081,492 | 3/1963 | Grzegorczyk | 18/30 |
| 3,975,479 | 8/1976 | McClean | 264/102 |
| 4,374,081 | 2/1983 | Hiltz et al. | 264/102 |
| 4,412,804 | 11/1983 | Huther | 425/546 |
| 4,439,386 | 3/1984 | Antczak | 264/102 |
| 4,655,700 | 4/1987 | Ahmed | 425/73 |
| 4,657,714 | 4/1987 | Kenmochi et al. | 264/1.3 |
| 4,770,824 | 9/1988 | Blom | 264/152 |
| 4,824,631 | 4/1989 | Yeager | 264/152 |
| 4,863,663 | 9/1989 | Nico, Jr. et al. | 264/152 |
| 4,927,600 | 5/1990 | Miyashita et al. | 419/49 |
| 4,997,606 | 3/1991 | Mears et al. | 264/102 |
| 5,059,112 | 10/1991 | Wieser | 425/546 |
| 5,248,467 | 9/1993 | Cushman | 264/102 |
| 5,340,512 | 8/1994 | Slocum et al. | 264/37 |
| 5,435,943 | 7/1995 | Adams et al. | 264/1.1 |
| 5,518,385 | 5/1996 | Graff | 425/127 |
| 5,639,416 | 6/1997 | Pennisi et al. | 264/571 |
| 5,817,202 | 10/1998 | Seidner | 264/152 |

OTHER PUBLICATIONS

Manual entitled: Application of Metal–Resin Compound to Mold—Quinnate Mez Series, by A. Ishikawa, President, Zeon Rize Co., Ltd. And T. Tsutui, Zeon Rize R&D Center, Zeon Rize Co., Ltd., No. 7 Kyobashi Nagaoya Bldg., 3–19–2, Hatchobori, Chuo–ku, Tokyo 104, Japan, received by applicants on/about Jan. 1, 1998.

*Primary Examiner*—Allan R. Kuhns
*Attorney, Agent, or Firm*—Perman & Green, LLP

[57] ABSTRACT

Fully dense composite accurate tooling is manufactured by casting but without the requirement of subsequent machining. The tooling so provided by the invention comprises injection mold halves for mating engagement to form a mold for injecting multiple near net shapes using either thermoset or thermoplastic materials. A known vacuum casting technique used for producing parts has been modified to make tooling according to the invention. A master pattern of the near net shape or a model of the actual core and cavity of the desired mold is used to create a silicone rubber mold (SRM). Once the SRM is completed, the 3-part material (catalyst, resin and composite) is weighed to the required volume to cast into the SRM, then placed (along with the SRM) into the vacuum casting system which reaches a level of 28 inches Hg of vacuum. The 3-part composite material is thoroughly mixed for approximately 20 minutes in about 28 inches Hg of vacuum. Similarly, the composite mixture is automatically poured into the SRM at about 28 inches Hg of vacuum. By so mixing and pouring the three-part composite material in vacuum, the by-product of the catalytic reaction ($CO_2$ or other gas that creates bubbles or voids) are virtually eliminated. After fully curing the three-part composite SRM, the end result of this unique process is a fully dense injection mold capable of holding tolerances of +/−0.002 inches while molding materials ranging from polyolefins to polyetherimides.

13 Claims, 7 Drawing Sheets

CONSTRUCTING FULLY DENSE COMPOSITE ACCURATE TOOLING

BACKGROUND OF THE INVENTION

1. Field of the Invention

The present invention relates generally to systems for manufacturing high quality cast products and, more particularly, to accurately fabricating a fully dense composite injection molding tool element intended for repeated use.

2. Description of the Prior Art

Known vacuum casting systems have been used to prototype parts up to about six feet in length, including car bumpers and aircraft turbine blades. The key component of each system comprises a vacuum chamber with two sections. The upper section serves to mix the resin and the lower section is for casting the resin into the mold. First, an inexpensive mold is produced by casting over a master model in silicone rubber. The master model can be made in wax, wood, plastic, metal, or stereolithography materials. After curing, the mold is placed in the lower chamber of the machine. Resin is mixed in the upper chamber and gravity-fed through a plastic hose into the mold below it. The mixing and casting procedures take place in a vacuum of about 28 inches Hg. This eliminates bubbles and voids in both the mold and the plastic prototype part.

Many specially-formulated resins for vacuum casting are available to provide various characteristics in hardness, toughness, flexibility, and temperature resistance. The casting and curing steps can be completed in about 20 to 90 minutes. All resins can be colored through use of pigments.

The final vacuum cast product is a precise replica of the master, dimensionally accurate without blemishes, with all profiles and textures faithfully reproduced. This system is capable of achieving finishes equivalent to those obtained by injection molding with ABS.

Typical of the prior art relating to injection molding is U.S. Pat. No. 5,639,416 issued Jun. 17, 1997 to Pennisi et al. which discloses a process for molding dimensionally stable accurate plastic articles using a low pressure injection molding technique with a two-piece silicone rubber mold having a cavity representative of the shape of the article to be molded.

U.S. Pat. No. 4,927,600 issued May 22, 1990 to Miyashita et al. discloses a method for molding powders of metals or ceramics comprising allowing a pouch-like member of thin-walled rubber-like resilient material to be expanded into tight contact with the inner surface of an air-permeable mold carrier of a powdered filler material maintained under a negative pressure for holding its form, thereby producing a mold, charging starting powders into the mold, discharging air from the inside of the mold through an opening of the pouch-like member, then sealing the mold, then disintegrating the air-permeable mold carrier for removing a pre-molded body or article enclosed in the pouch-like member, and processing the pre-molded body by a cold or hot isostatic press for increasing the density of the pre-molded body or article.

The following patents disclose various operations including mixing, potting, curing, molding, and impregnating all while being performed in a vacuum:

| U.S. Pat. No. | Inventor(s) | Issued |
|---|---|---|
| 4,657,714 | Kenmochi et al. | 04-14-87 |
| 4,655,700 | Ahmed | 04-07-87 |
| 4,412,804 | Hüther | 11-01-83 |
| 4,374,081 | Hiltz et al. | 02-15-83 |
| 3,081,492 | Grzegorczyk | 03-19-63 |
| 2,696,022 | Steinboek et al. | 12-07-54. |

The following U.S. patents all disclose evacuation of molding apparatus in order to remove dissolved gasses from the polymer-based mixture employed in the molding process:

| U.S. Pat. No. | Inventor(s) | Issued |
|---|---|---|
| 5,518,385 | Graff | 05-21-96 |
| 5,435,943 | Adams et al. | 07-25-95 |
| 5,340,512 | Slocum et al. | 08-23-94 |
| 5,248,467 | Cushman | 09-28-93 |
| 5,059,112 | Wieser | 10-22-91 |
| 4,997,606 | Mears et al. | 03-05-91 |
| 4,439,386 | Antczak | 03-27-84 |
| 3,975,479 | McClean | 08-17-76. |

It was with knowledge of the foregoing state of the technology that the present invention has been conceived and is now reduced to practice.

SUMMARY OF THE INVENTION

The present invention discloses the manufacture by casting of fully dense composite accurate tooling but without the requirement of subsequent machining. The tooling so provided by the invention comprises injection mold halves for mating engagement to form a mold for injecting multiple near net shapes using either thermoset or thermoplastic materials. A known vacuum casting system for producing parts has been modified to make tooling according to the invention. A master pattern of the near net shape or a model of the actual core and cavity of the desired mold is used to create a silicone rubber mold (SRM). Once the SRM is completed, the 3-part material (catalyst, resin and composite) is weighed to the required volume to cast into the SRM, then placed (along with the SRM) into the vacuum casting system which reaches a level of 28 inches Hg of vacuum. The 3-part composite material is thoroughly mixed for approximately 20 minutes in about 28 inches Hg of vacuum. Similarly, the composite mixture is automatically poured into the SRM at about 28 inches Hg of vacuum. By so mixing and pouring the 3-part composite material in vacuum, the by-product of the catalytic reaction ($CO_2$ or other gas that creates bubbles or voids) are virtually eliminated. After fully curing the 3-part composite SRM, the end result of this unique process is a fully dense injection mold capable of holding tolerances of +/−0.002 inches while molding materials ranging from polyolefins to polyetherimides, at injection molding cycles comparable to conventional machined injection mold tools. Basically, the method of fully mixing and pouring the 3-part composite compounds in a vacuum environment of 28 inches of mercury produces results once only capable through machining the actual metal, e.g. steel, copper, aluminum, and their alloys. Experience to date has been gained, for example, with 75% aluminum filled epoxy composite currently known under the trademark "EP-250" composite. However, also being developed is a 50–70% copper filled composite as well as a ceramic compound. Other possible fillers include tungsten carbide and steel.

In short, then, it is presently known to cast prototype parts predominately made from two-part thermoset urethane material. The invention proposes making injection molded tools using the same process with heavily filled epoxy or, indeed, any two-part material (catalyst and resin). However, in the latter process, both steps of mixing and pouring are performed in a vacuum. In the past, it was customary to either:

mix in a vacuum, then pour in the surrounding atmosphere; or mix in the surrounding atmosphere and pour in a vacuum.

For clarity of description, the following relates a series of 18 steps for a prototyping system utilizing the invention, steps 13 and 14 being particularly novel steps:

(a) prepare the master pattern and chamber;

(b) construct a casting frame and stage the master pattern; repeat for the chamber;

(c) measure and mix the ductile two-part thermo-set plastic material (e.g. room temperature vulcanizing RTV) silicone;

(d) de-gas the RTV silicone;

(e) pour the RTV silicone into the casting frame, encapsulating the master pattern and chamber;

(f) de-gas the RTV silicone a second time;

(g) cure the staged RTV silicone mold in an oven at 40° C.;

(h) after oven curing, separate the RTV silicone mold by cutting to the predetermined parting line;

(i) mold finished; . . . then cast the injection molding tool element;

(j) assemble the RTV silicone mold;

(k) measure out the composite mixture consisting of catalyst, resin and powdered metal;

(l) place the composite mixture into the vacuum casting system;

(m) degas and mix the composite mixture thoroughly;

(n) cast the composite mixture into the mold;

(o) cure the cast mold in an oven at about 40° C. for about 12 hours;

(p) perform a secondary curing at about 70° C. for an additional 5 hours;

(q) separate the mold and remove the cast component, cleaning gates and vents; and (r) finished component results.

A primary feature, then, of the present invention is the provision of a system for manufacturing high quality cast products.

Another feature of the present invention is the provision of such a system for accurately fabricating a filly dense composite injection molding tool elements intended for repeated use.

Still another feature of the present invention is the provision of such a system which can achieve fully dense tools which are sturdy and capable of repeated use.

Yet another feature of the present invention is the provision of such a system which is able to injection mold a large variety of materials from commodity thermoset plastics to high performance thermoplastics.

Yet a further feature of the present invention is the provision of such a system which enables the employment of a wide variety of filler materials including aluminum, copper, tungsten carbide, steel, and ceramics.

Still a further feature of the present invention is the provision of such a system capable of fabricating tools which are highly accurate because they have virtually no voids.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and together with the description, serve to explain the principles of the invention in general terms. Like numerals refer to like parts throughout the disclosure.

DETAILED DESCRIPTION OF THE PREFERRED EMBODIMENTS

Figure 1:
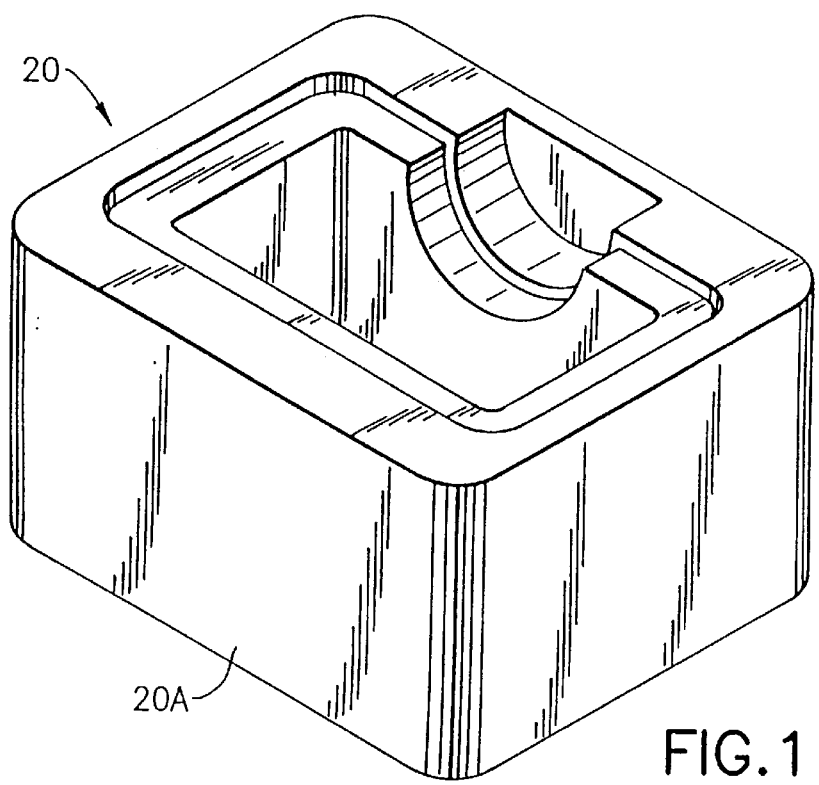
FIG. 1 is a perspective view of either a master pattern employed for the technique of the invention or of a tool element resulting from operation of the technique of the invention.
Figure 2:
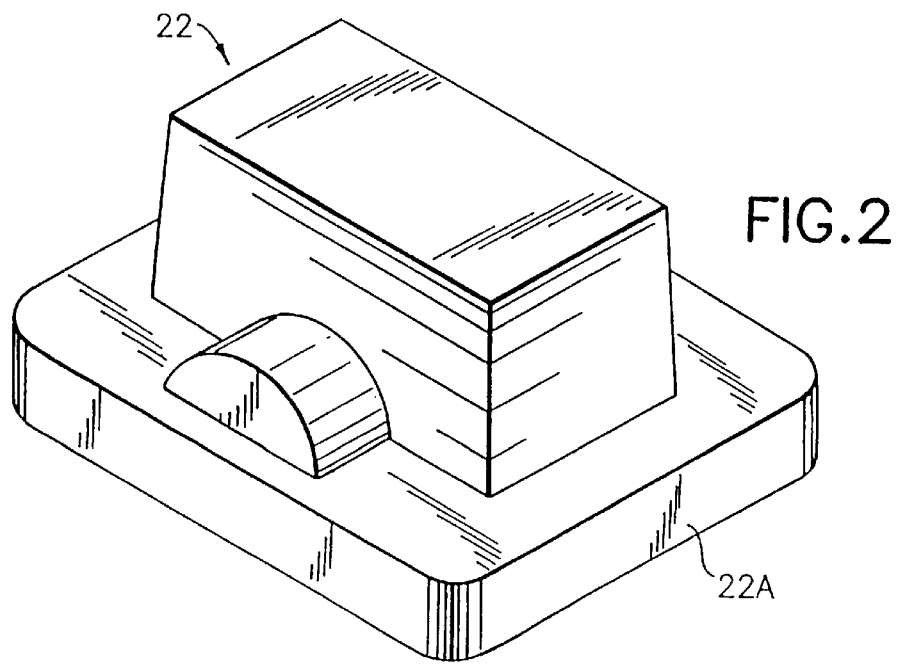
FIG. 2 is a perspective view of either another master pattern employed for the technique of the invention or of another tool element resulting from operation of the technique of the invention.
Figure 3:
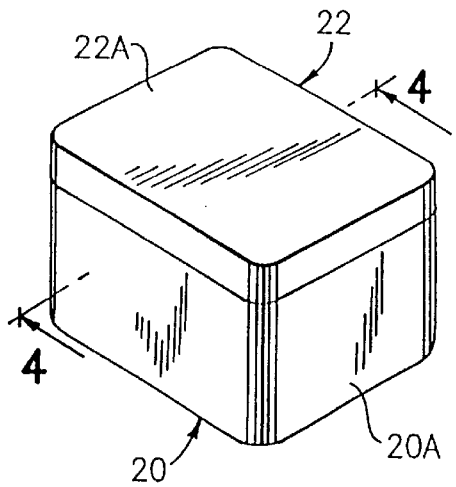
FIG. 3 is a perspective view of the tool elements illustrated in FIGS. 1 and 2 assembled in a contiguous relationship so as to define between them a hollow region having the shape and size of a desired part.
Figure 4:
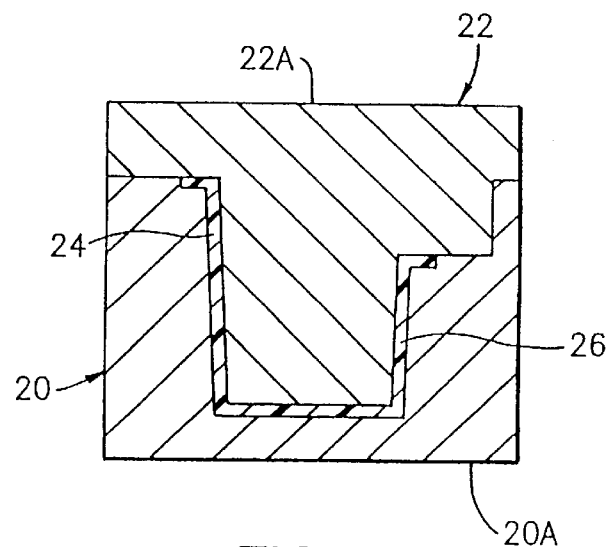
FIG. 4 is a cross section view taken generally along line 4—4 in FIG. 3.
Figure 5:
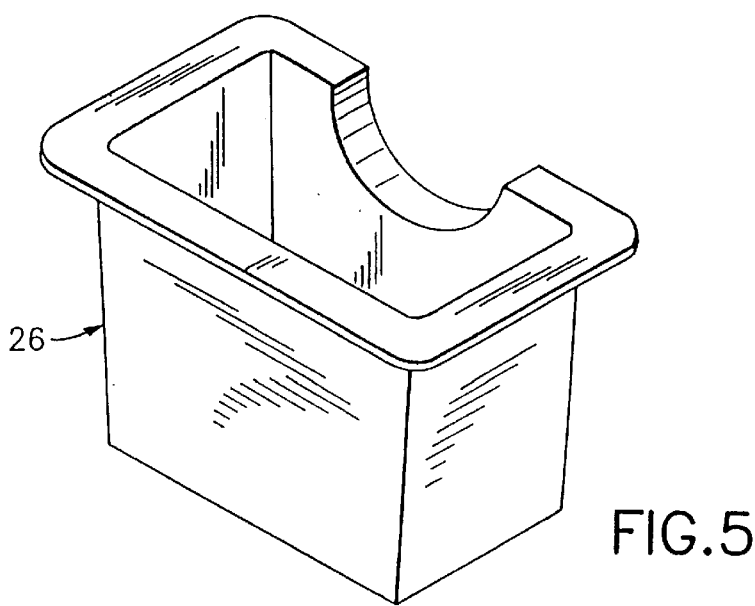
FIG. 5 is perspective view of a desired part resulting from the use of the tool elements illustrated in FIGS. 1–4.

Turn now to FIGS. 1–5 of the drawings for initiating discussion of a technique according to the present invention for accurately fabricating filly dense composite injection molding tool elements 20 (FIG. 1) and 22 (FIG. 2) intended for repeated use. The tool elements 20 and 22 have a mating relationship and, in FIGS. 3 and 4, are illustrated assembled in a contiguous relationship so as to define between them a hollow region 24 having the shape and size of a desired part 26 (FIGS. 4 and 5).

At the outset, a master pattern is prepared for each tool element 20, 22. It can be made of metal, wood, plaster, plastic, or even wax. This includes solid free form modeling patterns (rapid prototyped parts) made from epoxy, wax, polyethylene, ABS, nylon, polystyrene, polycarbonate, vinyl esters, acrylates, and paper. Any pattern or finish on that pattern that will not affect the silicone curing process to be discussed below can be used. The finish of this pattern is critical and the tolerances in the pattern will be faithfully reproduced in the casting process. Throughout this disclosure, the reference numerals 20, 22 will be used to denote both the tool elements and the master patterns since, indeed, both have the identical shape and size and the particular context will govern when each term is appropriately used.

Figure 6:
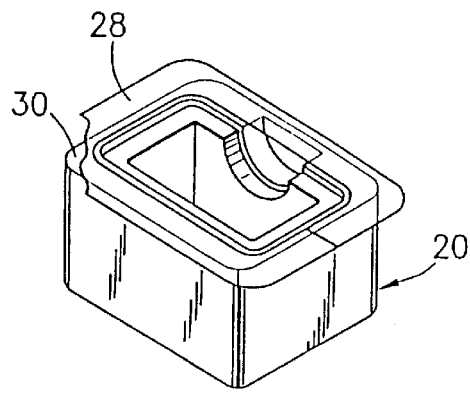
FIGS. 6 and 7 are perspective views of the master pattern of FIG. 1 modified to incorporate an indicator of an established continuous peripheral parting line.
Figure 7:
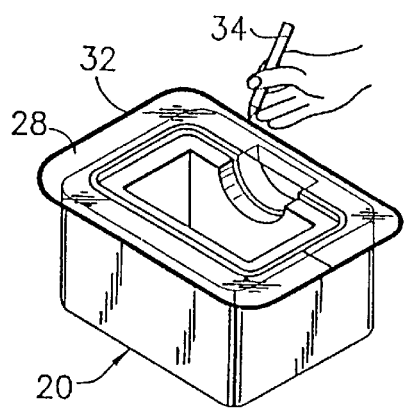

The master patterns 20, 22, then, have contoured outer surfaces 20A, 22A, respectively, of predetermined shape which define the shape of the desired injection molding tool element. Continuing with the procedure, it is necessary to provide each of the master patterns with an established continuous peripheral parting line. For ease of continued explanation, further discussion of the master patterns 20, 22 will be limited to the master pattern 20 although the discussion at all times could also be taken to mean master pattern 22. In any event, to the end of providing each of the master patterns with an established continuous peripheral parting line, viewing FIG. 6, an acceptable practice is to attach clear adhesive tape to an appropriate parting surface 30 of the master pattern 20. Thereafter, as illustrated in FIG. 7, an edge 32 of the tape 30 is scribed with a marker pen 34 to later assist in removal of the master pattern from the silicone tool as will be described below.

Figure 8A:
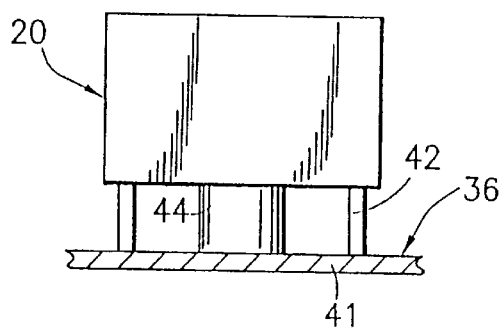
FIG. 8A is a transverse cross section view taken through the casting frame of FIG. 8 illustrating the master pattern positioned therein supported on vent and gate pedestals.
Figure 8:
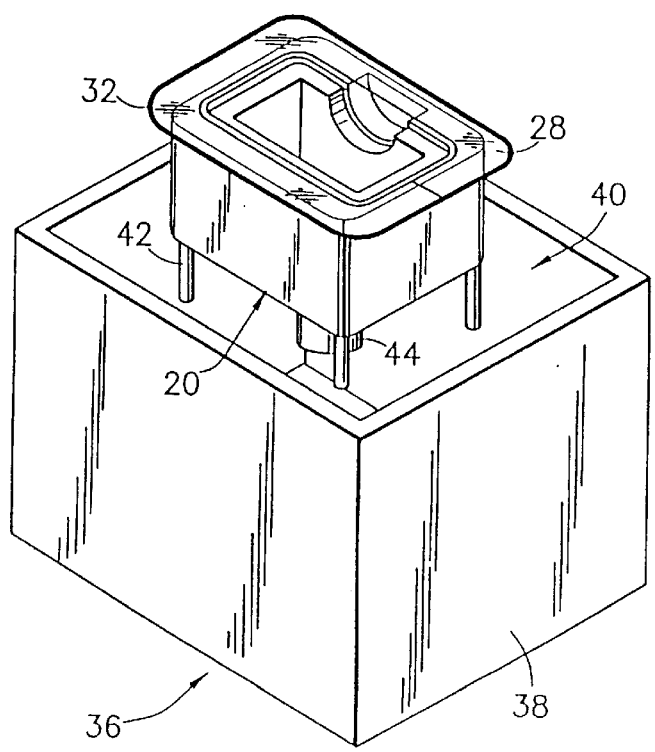
FIG. 8 is a perspective view of a casting frame into which the master pattern is being positioned.
Figure 9:
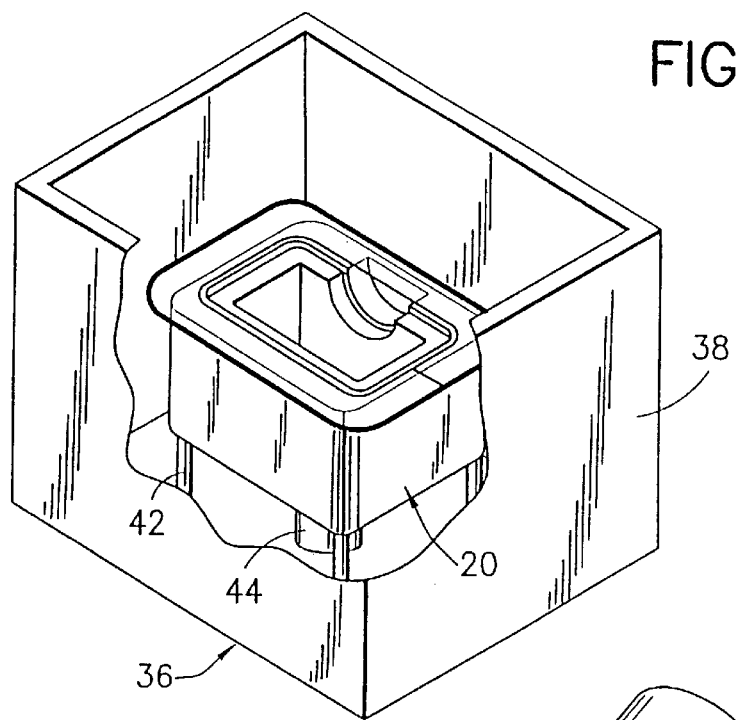
FIG. 9 is a perspective view, certain parts being cut away for clarity, of the casting frame with the master pattern finally positioned in its interior chamber.

In a customary fashion, turning now to FIGS. 8 and 8A, the technique of the invention utilizes a casting frame 36 including an outer enclosure 38 defining an interior chamber 40. The casting frame may be constructed from ABS plastic or laminated chipboard or other suitable material. The master pattern 20 (which, as previously stated, may just as properly be master pattern 22) is positioned centrally within the interior chamber 40 of the casting frame, supported above a base 41 of the enclosure 38 on a plurality of peripherally spaced vent pedestals 42 and a centrally positioned gate pedestal 44. With this arrangement, at all locations, the master pattern 20 is spaced from the enclosure 38.

Figure 10:
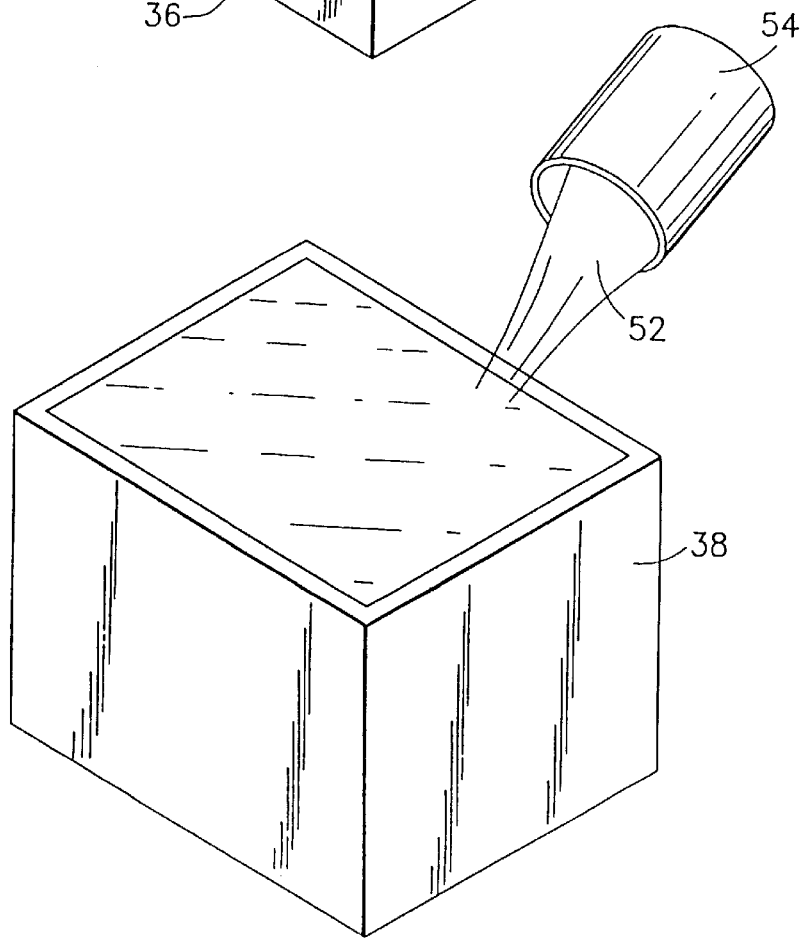
FIG. 10 is a perspective view of the casting frame containing the master pattern positioned therein, with plastic material being poured into the interior chamber.
Figure 11:
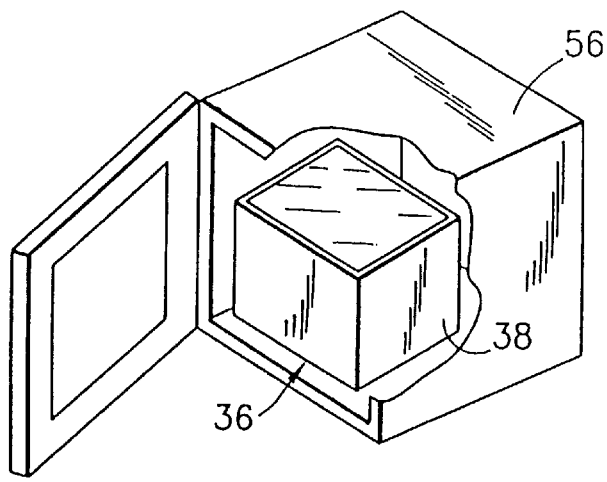
FIG. 11 is a perspective view, certain parts being cut away for clarity, of the casting frame placed into a vacuum chamber for further de-gassing of its contents.

With the master pattern 20 so positioned in the casting frame 36, preparations are made to pour a suitable plastic material 52 (see FIG. 10) in the liquid state into the interior chamber 40 of the casting frame so as to fully encapsulate the master pattern. In this regard, a foremost preparation is to de-gas a supply of the plastic material 52, preferably ductile two-part thermoset plastic material. The ductile two-part thermoset plastic material is preferably RTV (room temperature vulcanizing) silicone although it may also be urethane or epoxy, for example. The de-gassing of the supply of the plastic material 52 may be accomplished while the plastic material remains in its original containers 54. Thereafter, when the plastic material is fully poured into the interior chamber 40 of the casting frame 36, the entire casting frame may be placed into a vacuum chamber 56 (FIG. 11) for further de-gassing, for example, for a duration of about four hours at a temperature of about 40° C. Because of this two-step de-aeration processing, exact replication of the features of the master pattern can be achieved.

Figure 12:
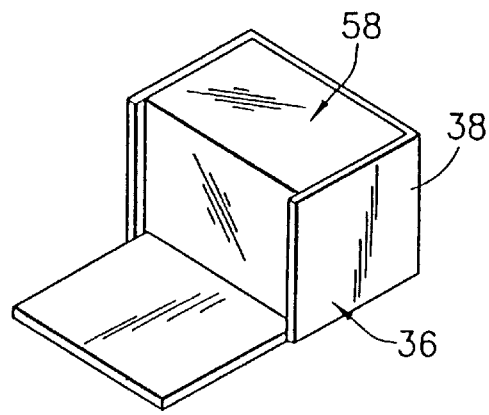
FIG. 12 is a perspective view of the casting frame being removed from the resulting mold half of solidified plastic material following the curing operation.
Figure 13:
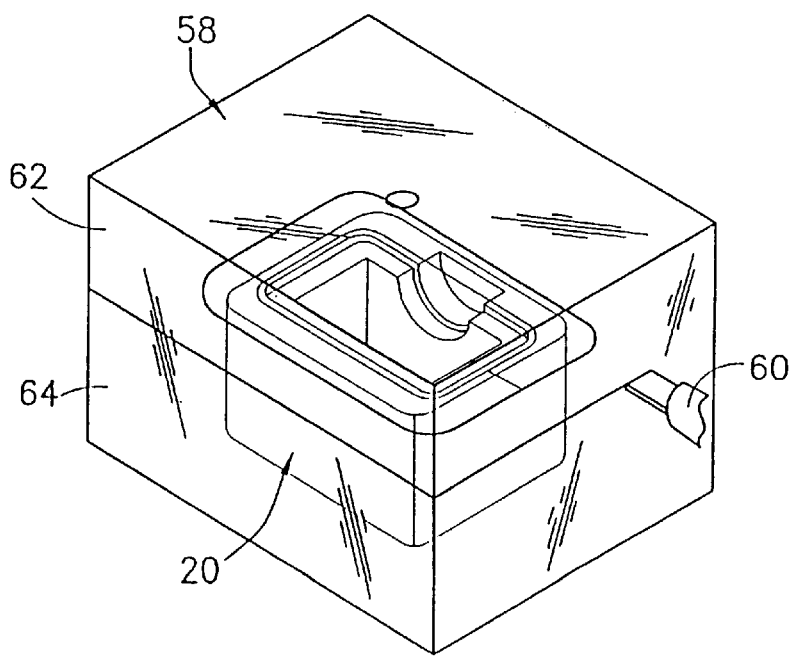
FIG. 13 is a perspective view of the resulting mold half of solidified plastic material following the curing operation being cut to the continuous peripheral parting line of the master pattern and resulting in first and second mold components.
Figure 14:
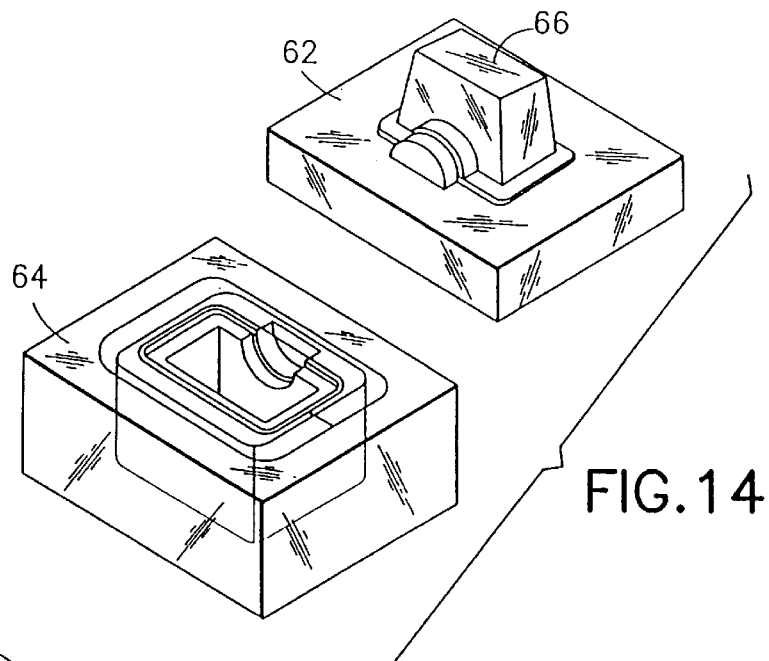
FIG. 14 is an exploded perspective view of first and second mold components which result from the cutting operation of FIG. 13.

Thereafter, the liquid plastic material 52 encapsulating the master pattern is cured to form a resulting mold half of solidified plastic material 58. This curing operation is typically performed for a duration of about five hours and at a temperature of about 40° C. The cured, solidified, plastic material 56 is then removed from the casting frame 36 as depicted in FIG. 12. With a knife 60 or in some other suitable manner, viewing FIG. 13, the solidified plastic material 58 is cut to the continuous peripheral parting line of the master pattern as represented by the clear adhesive tape 28 and the tape edge 32 earlier marked on the tape. Alternatively, a predetermined visible parting line may be provided by marking the outer surface of the master pattern itself with a marking pen. In any event, this cutting activity results in first and second mold components, 62, 64, respectively (see FIG. 14).

Figure 15:
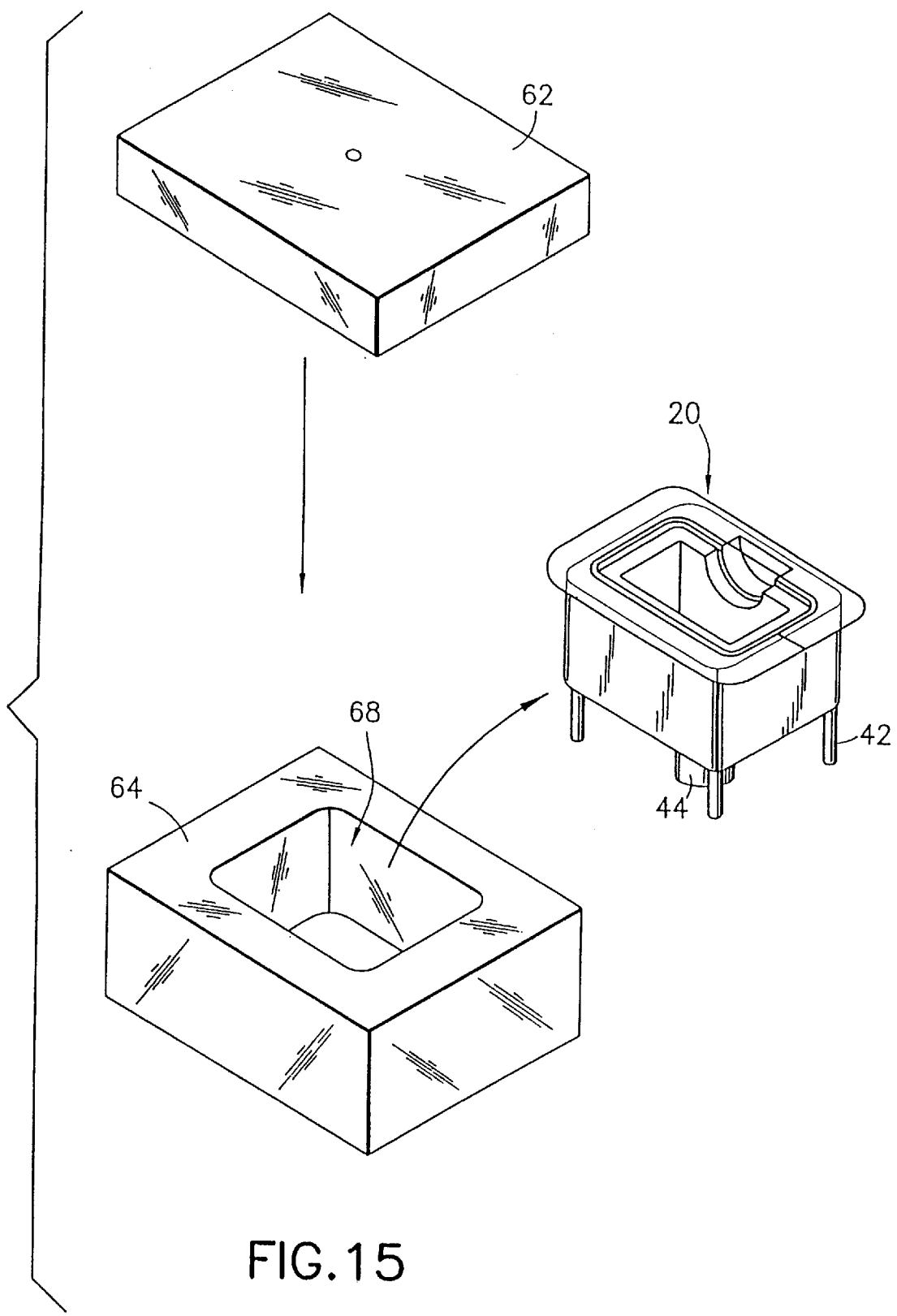
FIG. 15 is an exploded perspective view illustrating the master pattern separated from the first and second mold components.

Now viewing FIG. 15, for the next step of the procedure, the master pattern 20 is separated from the first and second mold components, 62, 64 resulting in a first contoured element 66 (FIG. 14) in the first mold component and a second contoured element 68 in the second mold component. The casting gate 42 and the vent member 48 are trimmed off.

Figure 16:
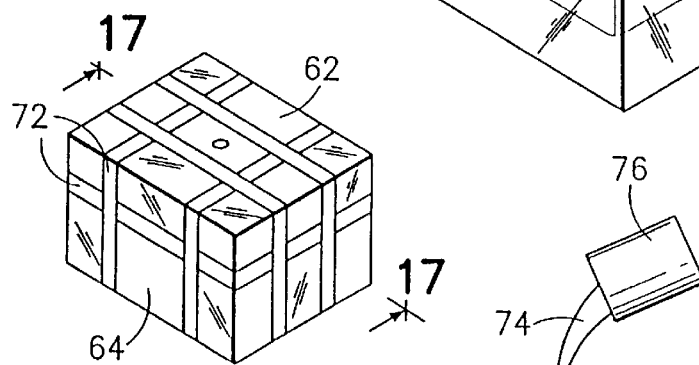
FIG. 16 is a perspective view illustrating the mold components re-assembled in abutting relationship with elongated adhesive tape applied to tightly encircle the mold components and retain them in a contiguous relationship.
Figure 17:
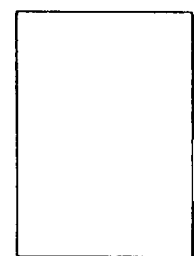
FIG. 17 is a cross section view taken generally along line 17—17 in FIG. 16.
Figure 17:
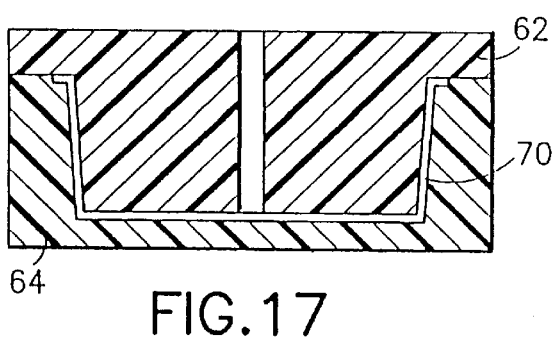

At this point, now viewing FIGS. 16 and 17, the master cavity 70 of the first and second mold components 62, 64 is prepared for casting with a light spray of mold release. The mold components 62, 64 are then re-assembled in abutting relationship such that the first and second contoured elements 66, 68 together define a master cavity 70 having the predetermined shape of the master pattern 20. Elongated adhesive tape 72 is applied so as to tightly encircle the mold components 62, 64 and retain them in a contiguous relationship.

Figure 19:
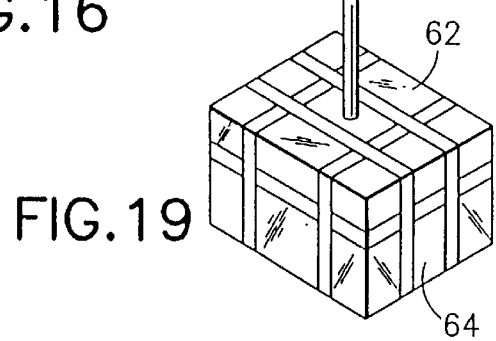
FIG. 19 is a perspective view illustrating the mold components re-assembled in abutting relationship as illustrated in FIG. 16 with the thoroughly mixed composite mixture being poured, also in a vacuum, into the master chamber defined by the mold components.
Figure 18:
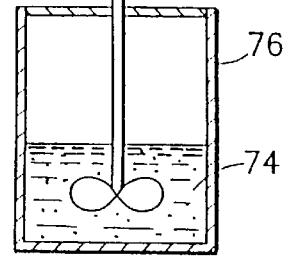
FIG. 18 is a diagrammatic elevation view, certain parts being cut away and shown in section, illustrating the operation of thoroughly mixing in a vacuum a composite mixture consisting of catalyst, resin and powdered metal and/or ceramic material.

For the next step, a composite mixture 74, such as that known under the trademark "EP-250" consisting of catalyst, resin and powdered metal and/or ceramic material is thoroughly mixed for about 20 minutes in a vessel 76 76 under about 28 inches Hg vacuum. Essential characteristics of the plastic material 52, for purposes of the invention, are: (1) that it be high volume metal filled, preferably in the approximate range of 60 to 80% metal and (2) that it be readily pourable under atmospheric conditions. This is diagrammatically illustrated in FIG. 18. The composite mixture may be a variety of combinations. For example, it may include urethane and at least 50% by weight of metal powder, or epoxy and at least 50% by weight of metal powder, or urethane and at least 50% by weight of ceramic powder, or epoxy and at least 50% by weight of ceramic powder. The metals may be aluminum or copper or others alone or in mixture and other combinations are also possible. In any event, as depicted in FIG. 19, the thoroughly mixed composite mixture 74 is then poured, also in a vacuum of about 28 inches Hg, into the master chamber 70 defined by the mold components 62, 64.

By so mixing and pouring the 3-part composite mixture 74 in vacuum the by-products of the catalytic reaction (for example, $CO_2$ or other gases that create bubbles and voids) are virtually eliminated. After fully curing the composite mixture, the end result of this unique process is a fully dense injection mold element capable of holding tolerances of +/−0.002 inches while molding materials ranging from polyolefins to polyetherimides, at injection molding cycles comparable to conventional machined injection mold tools. Basically, the method of fully mixing and pouring the composite mixture in a vacuum environment of about 28 inches Hg produces results once only capable through machining the actual metal such as steel, aluminum, and the like.

The composite mixture 74 is then cured and solidified in a two step process to form the injection molding tool element 20 or 22. The first cure is performed at about 40° C. for about 12 hours, followed by a secondary cure at about 70° C. for about 5 hours. The first cure cycle is to control shrinkage and reduce thermal shock thus reducing the coefficient of thermal expansion and allowing for better tolerances. The second cure is to facilitate increased compressive strength and higher rigidity. After curing, the elongated adhesive tape 72 is removed and the first and second mold components 62, 64 are separated enabling removal of the finished injection molding tool element 20 or 22.

The mold elements 62, 64 may be used as often as necessary to manufacture additional tool elements 20, 22.

While preferred embodiments of the invention have been disclosed in detail, it should be understood by those skilled in the art that various other modifications may be made to the illustrated embodiments without departing from the scope of the invention as described in the specification and defined in the appended claims.

What is claimed is:

1. A method of accurately fabricating a fully dense composite injection molding tool element for repeated use comprising the steps of:
    (a) preparing a master pattern having a contoured outer surface of predetermined shape of the desired injection molding tool element and an established continuous peripheral parting line;
    (b) providing a casting frame including an outer enclosure defining an interior chamber;
    (c) positioning the master pattern centrally within the chamber of the casting frame;
    (d) de-gassing a supply of ductile two-part thermoset plastic material;
    (e) pouring the de-gassed plastic material of step (d) into the chamber of the casting frame so as to fully encapsulate the master pattern;
    (f) again de-gassing the plastic material which was poured into the chamber of the casting frame in the preceding step;
    (g) curing the plastic material encapsulating the master pattern to form a resulting mold half of solidified plastic material;
    (h) removing the cured plastic material from the casting frame;
    (i) cutting through the solidified plastic material to the continuous peripheral parting line of the master pattern resulting in first and second mold components;
    (j) separating the master pattern from the first and second mold components resulting in a first contoured element in the first mold component and a second contoured element in the second mold component;
    (k) re-assembling the first and second mold components in abutting relationship such that the first and second contoured elements together define a master cavity having the predetermined shape of the master pattern;
    (l) thoroughly mixing a composite mixture consisting of catalyst, resin and powdered metal and/or ceramic material in a vacuum;
    (m) pouring in a vacuum the thoroughly mixed composite mixture into the master chamber of step (k);
    (n) curing the composite mixture of steps (l) and (m) to form the injection molding tool element;
    (o) separating the first and second mold components; and
    (p) removing the finished injection molding tool element from the first and second mold components.

2. A method as set forth in claim 1 wherein the injection molding tool element of claim 1 is a first injection molding tool element; and including the steps of:
    (q) preparing a second master pattern having a contoured outer surface of predetermined shape of a second desired injection molding tool element and an established continuous peripheral parting line;
    (r) performing steps (b) through (p) for producing the second injection molding tool element; and
    (s) assembling the first and second injection molding tool elements in contiguous relationship to define between them a hollow region having the shape and size of a desired part.

3. A method as set forth in claim 1 wherein the ductile two-part thermoset plastic material of step (d) includes room temperature curing silicone.

4. A method as set forth in claim 1 wherein the duration of step (d) is approximately four hours at a temperature of about 40° C.

5. A method as set forth in claim 1 wherein step (g) is performed for about five hours at a temperature of about 70° C.

6. A method as set forth in claim 1 wherein step (l) is performed for about 20 minutes under a vacuum of about 28 inches Hg.

7. A method as set forth in claim 1 wherein step (m) is performed under a vacuum of about 28 inches Hg.

8. A method as set forth in claim 1 wherein the mixture of step (l) includes urethane and at least 50% by weight of metal powder.

9. A method as set forth in claim 1 wherein the mixture of step (l) includes epoxy and at least 50% by weight of metal powder.

10. A method as set forth in claim 1 wherein the mixture of step (l) includes urethane and at least 50% by weight of ceramic powder.

11. A method as set forth in claim 1 wherein the mixture of step (l) includes epoxy and at least 50% by weight of ceramic powder.

12. A method as set forth in claim 1 wherein step (n) is performed at about 40° C. for about 12 hours.

13. A method as set forth in claim 12 including the further step, after step (n), of:

(o) performing a secondary cure at about 70° C. for about 5 hours.

* * * * *